F. P. McCARTY.
GAS RANGE.
APPLICATION FILED MAY 19, 1917.

1,257,373.

Patented Feb. 26, 1918.

Inventor,
Franklin P. McCarty.
By Bakewell & Cornwall, attys.

UNITED STATES PATENT OFFICE.

FRANKLIN P. McCARTY, OF ST. LOUIS, MISSOURI.

GAS-RANGE.

1,257,373.

Specification of Letters Patent.

Patented Feb. 26, 1918.

Application filed May 19, 1917. Serial No. 169,807.

*To all whom it may concern:*

Be it known that I, FRANKLIN P. MC-CARTY, a citizen of the United States, residing at St. Louis, Missouri, have invented a certain new and useful Improvement in Gas-Ranges, of which the following is a full, clear, and exact description, such as will enable others skilled in the art to which it appertains to make and use the same.

This invention relates to gas ranges, and particularly to the construction of the baking ovens of such stoves.

One object of my present invention is to provide a gas range which is constructed in a novel manner that prevents the heat from radiating from same into the room in which the range is located.

Another object is to provide a gas range which is so designed that the baking oven will be maintained at a temperature high enough to bake food a comparatively long time after the oven burners have been extinguished.

And still another object is to provide a gas range that is equipped with a baking oven which is so designed that practically all of the heat units from the products of combustion will be utilized to heat the contents of the oven and also heat absorbing material that is combined with the walls of the oven, said heat absorbing material serving to maintain the oven at a baking temperature after the oven burners have been extinguished, and thus overcoming the necessity of keeping the oven burners in operation until the baking operation is completed. Other objects and desirable features of my invention will be hereinafter pointed out.

Figure 1:
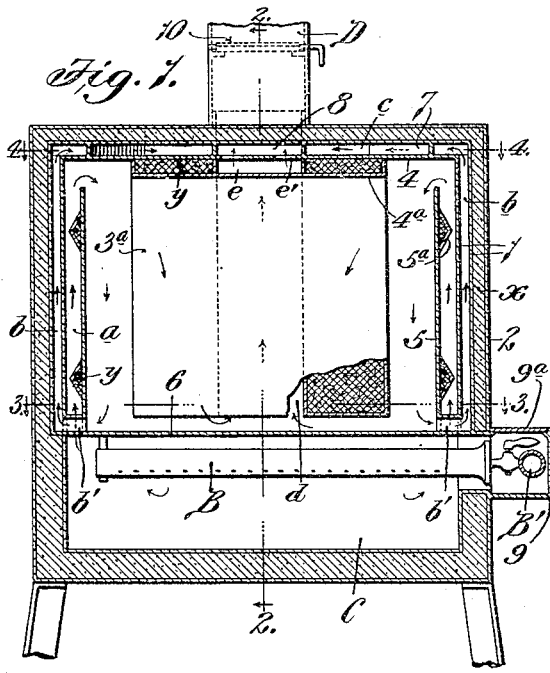

Figure 1 of the drawings is a vertical transverse sectional view of a gas range constructed in accordance with my invention.

Figure 2:
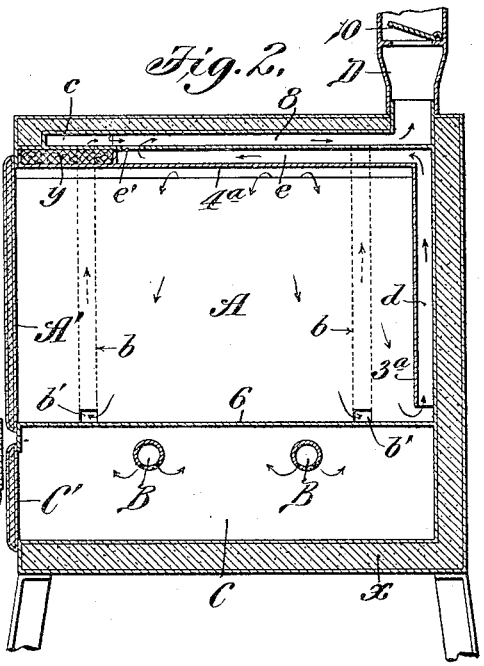
Figure 3:
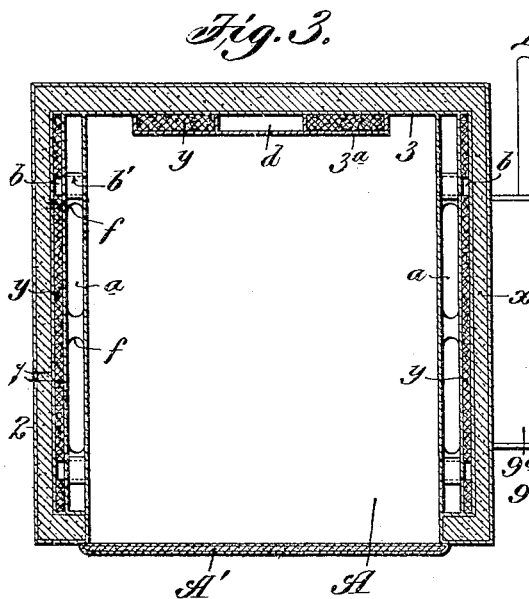
Figure 4:
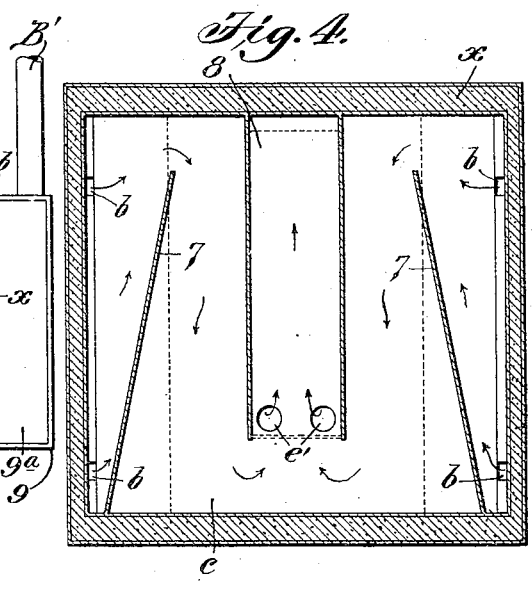

Fig. 2 is a vertical longitudinal sectional view, taken on the line 2—2 of Fig. 1; and Figs. 3 and 4 are horizontal sectional views taken on the lines 3—3 and 4—4, respectively, of Fig. 1.

Referring to the drawings which illustrate the preferred form of my invention, A designates the baking oven of my improved gas range, B designates the oven burners and C designates the burner space in which said burners are arranged, said burners and burner space being arranged in any desired position with relation to the oven, but preferably underneath the oven, so that the flames from the burners B will act directly on the bottom of the oven. The top wall and vertical walls of the oven A and the bottom wall and vertical walls of the burner space C are preferably insulated so as to prevent the heat from escaping or radiating from said walls into the room in which the range is located. In the form of my invention herein illustrated the walls above referred to are hollow and are filled with heat insulating material $x$, but it is immaterial, so far as my invention is concerned, how the walls of the oven and the burner space are constructed, so long as they are designed in such a manner that they will not act as heat radiators that throw the heat outwardly into the room in which the range is located.

The walls of the oven A are provided with heat absorbing material of any character and also flues which are so designed and arranged that the products of combustion from the burner space C will follow a tortuous path in escaping from the burner space C to the smoke pipe D. The heat absorbing material above referred to can be arranged in various ways, and the flues through which the escaping products of combustion travel can also be arranged in various ways, but I prefer to arrange heat absorbing material $y$ in the side walls and the rear wall and in the top wall of the oven A and provide said walls with flues which are so disposed with relation to the heat absorbing material that the escaping products of combustion will not ony heat the interior of the oven, but will also heat said heat absorbing material $y$. As shown in the drawings, the oven A is provided with double side walls or hollow portions, formed by plates 1 and 2, that are filled with heat absorbing material $y$, and the rear wall 3 and top wall 4 of the oven are provided with hollow portions 3ª and 4ª, respectively, which are also filled with heat absorbing material $y$. Vertically-disposed plates 5 that extend from the front to the rear wall of the oven A, as shown in Fig. 3, coöperate with the hollow side walls of the oven to form vertical flues $a$. The lower ends of the flues $a$ communicate with the burner space C, and the upper edges of the vertical plates 5 terminate a short distance below the top wall 4 of the oven, so that the products of combustion that flow upwardly through the flues $a$, as indicated by the arrows in Fig. 1, will enter the oven adjacent the top portion of same. The hollow side walls are also provided with vertical flues *b* whose lower ends communicate with inlet ports *b'* formed in the vertical plates 5 adjacent the bottom 6 of the oven, the upper ends of said vertical flues *b* communicating with a hollow flue space *c* in the top wall 4 of the oven that is equipped with baffles 7, as shown in Fig. 4, which are so arranged that the products of combustion that enter the hollow flue space in the top wall 4 of the oven will flow rearwardly and thence forwardly to a horizontally-disposed flue 8 in the top wall 4 that connects at its rear end with the smoke pipe D, previously referred to. The hollow portion 3ª on the rear wall 3 of the oven is also provided with a vertical flue *d* whose lower end communicates with the oven A and whose upper end communicates with a horizontal flue *e* formed in the hollow portion 4ª on the top wall of the oven, the flue *e* being provided at its front end with ports *e'*, shown in Fig. 2, that establish communication between the flue *e* and the horizontally-disposed flue 8 in the flue space of the top wall 4 of the oven. The vertical flues *b* in the side walls of the oven, the vertical flue *d* in the rear wall and the horizontal flue *e* on the top wall are preferably so arranged that they will be partially surrounded by the heat absorbing material *y*, and if desired, the vertically-disposed plates 5 previously referred to can be provided with hollow portions 5ª that are filled with heat absorbing material which is arranged in the path of travel of the products of combustion that flow upwardly through the vertical flues *a*, as shown in Fig. 1.

When the stove is in operation the products of combustion escape from the burner space C through openings *f* in the top wall thereof (shown in Fig. 3) into the vertical flues *a*, up through which the products of combustion travel to the upper portion of the oven. The products of combustion then flow downwardly through the oven to the lower ends of the vertical flues *b* in the side walls of the oven, and thence upwardly through said flues *b* to the flue space *c* in the top wall 4 of the oven. Upon entering said flue space *c* the products of combustion first flow rearwardly and then forwardly, as indicated by the arrows in Fig. 4, into the horizontally-disposed flue 8 which leads to the smoke pipe. Some of the products of combustion that are admitted to the oven by the vertical flues *a* enter the flue *d* on the rear wall of the oven, and thence flow upwardly through said flue and through the horizontal flue *e* into the flue 8. The oven A and the burner space C are provided with the usual doors A' and C', respectively, and if desired, the gas manifold B' that supplies gas to the oven burners can be provided with a casing 9 that incases or incloses the mixing valves on the oven burners, said casing having a removable top portion 9ª that is adapted to be taken off when the oven burners are in use. The smoke pipe D is also preferably provided with a damper 10 that is adapted to be closed when it is desired to retain the heat in the oven after the oven burners have been extinguished.

A gas range of the construction above described can be operated without greatly raising the temperature of the room in which it is located, owing to the fact that the outer walls of the oven and the burner space of the range contain heat insulating material or are constructed in such a manner that the heat in the oven and in the burner space will not readily penetrate through said walls and radiate into the surrounding atmosphere. Furthermore, a gas range of the construction above described can be operated at a low cost, due to the fact that it is provided with flues which are so designed and arranged that practically all of the heat units are absorbed from the products of combustion while they are traveling from the burner space to the smoke pipe of the stove. And still another desirable feature of such a gas range is that the oven of same will be maintained at a sufficiently high temperature to bake food a considerable length of time after the oven burners have been extinguished, due to the fact that the walls of the oven are provided with heat absorbing material that is raised to a high temperature by the escaping products of combustion which travel through the flues in the walls of the oven. When the oven is being used to bake food, after the oven burners have been extinguished, it is preferable to close the damper 10 in the smoke pipe and also arrange the cover 9ª of the casing 9 in operative position, so as to eliminate the possibility of air being drawn into the oven through the mixing valves of the oven burners.

Having thus described my invention, what I claim, and desire to secure by Letters Patent, is:

1. A gas range provided with a baking oven and a burner space whose outer walls are insulated so as to prevent the heat from radiating outwardly from same, and flues combined with the top wall and vertical walls of the oven and constructed in such a manner that the products of combustion will flow in opposite directions through said vertical walls and in opposite directions through said top wall in escaping from the burner space, said oven being equipped with heat absorbing material arranged in such a manner that it will absorb heat from the escaping products of combustion.

2. A gas range equipped with a baking oven that is provided with flues which are so arranged that the products of combustion from the oven burners will flow upwardly at the sides of the oven into the upper portion of same, then downwardly through the oven, and thereafter upwardly through the side walls of the oven and horizontally through the top wall of the oven.

3. A gas range equipped with a baking oven that is provided with flues which are so arranged that the products of combustion from the oven burners will flow upwardly at the sides of the oven into the upper portion of same, then downwardly through the oven, and thereafter upwardly through the side walls of the oven and horizontally through the top wall of the oven, said oven being provided with heat absorbing material arranged in such a manner that it will absorb heat from the escaping products of combustion.

4. A gas range, comprising a baking oven, oven burners, and means for causing the products of combustion from said burners to enter the oven adjacent the upper part of same and then flow downwardly through the oven and thereafter upwardly through the side and rear walls of the oven into a flue space in the top wall of the oven, said flue space being provided with baffles that cause the escaping products of combustion that enter same to follow a tortuous path.

5. A gas range, comprising a baking oven, oven burners, means for causing the products of combustion from said burners to enter the oven adjacent the upper part of same and then flow downwardly through the oven and thereafter upwardly through the side and rear walls of the oven into a flue space in the top wall of the oven, said flue space being provided with baffles that cause the escaping products of combustion that enter same to follow a tortuous path, and heat absorbing material combined with the oven in such a manner that it absorbs heat from the escaping products of combustion.

6. A gas range, comprising a baking oven, a burner space arranged under the oven, vertical flues in the side walls of the oven, means for causing the products of combustion from the burner space to flow upwardly through the side walls, enter the oven adjacent the upper portion of same and flow downwardly through the oven and thereafter upwardly through the side wall flues, a flue space in the top wall of the oven that communicates with the upper ends of said vertical flues, and baffles arranged in said flue space in such a manner that they cause the escaping products of combustion to flow over practically the entire area of the top wall of the oven.

7. A gas range, comprising a baking oven, a burner space arranged under the oven, vertical flues in the side walls of the oven, means for causing the products of combustion from the burner space to flow upwardly through the side walls, enter the oven adjacent the upper portion of same and thereafter flow downwardly through the oven to the lower ends of vertical flues in the side walls up through which said products of combustion travel, a flue space in the top wall of the oven that communicates with the upper ends of some of the vertical flues in the side walls, baffles arranged in said flue space in such a manner that they cause the escaping products of combustion to flow in opposite directions over practically the entire area of the top wall of the oven, and heat absorbing material combined with the side walls and the top wall of the oven in such a manner that they will absorb heat from the escaping products of combustion.

8. A gas range, comprising a baking oven, vertical flues arranged at the sides and at the rear of the oven and having their lower ends communicating with the oven, means for causing the products of combustion from the oven burners to enter the upper portion of the oven and then flow downwardly through the oven to the lower ends of said vertical flues, a horizontally-disposed flue on the top of the oven which communicates with the vertical flue at the rear side of the oven, and a flue space in the top of the oven which communicates with the front end of said horizontal flue and with the upper ends of the vertical flues at the sides of the oven.

9. A gas range, comprising a baking oven, vertical flues arranged at the sides and at the rear of the oven and having their lower ends communicating with the oven, means for causing the products of combustion from the oven burners to enter the upper portion of the oven and then flow downwardly through the oven to the lower ends of said vertical flues, a horizontally-disposed flue on the top of the oven which communicates with the vertical flue at the rear side of the oven, a flue space in the top of the oven which communicates with the front end of said horizontal flue and with the upper ends of the vertical flues at the sides of the oven, baffles in said flue space that cause the products of combustion that enter same to flow in opposite directions through said space, and heat absorbing material combined with said vertical flues and horizontal flue in such a manner that it absorbs heat from the escaping products of combustion.

10. A gas range provided with a baking oven and a burner space whose outer walls are heat insulated, hollow portions on the rear wall and side walls of the oven that contain heat absorbing material and vertical flues, vertically-disposed plates that coöperate with the side walls of the oven to form uptake flues which conduct the products of combustion from the burner space into the upper portion of the oven, the vertical flues at the sides and rear wall of the oven having their lower ends communicating with the interior of the oven, a hollow portion on the top wall of the oven that contains heat absorbing material and a horizontal flue, and a flue space in the top wall of the oven that communicates with the front end of said horizontal flue and with the upper ends of the vertical flues at the sides of the oven.

11. A gas range, comprising a baking oven and a burner space whose outer walls are heat insulated, oven burners in said burner space, means for causing the products of combustion from the burner space to enter the upper portion of the oven and then flow downwardly through the oven and thence upwardly at the sides and rear of the oven into a flue space in the top wall of the oven, heat absorbing material arranged in such a manner that it will absorb heat from the escaping products of combustion, and means for completely cutting off the oven and burner space from the atmosphere after the oven burners have been extinguished.

12. A gas range, comprising a baking oven and a burner space whose outer walls are heat insulated, oven burners in said burner space, a gas manifold connected with said oven burners, a casing that houses the portion of the gas manifold to which the oven burners are connected, said casing being provided with a removable closure, a flue space in the top wall of the oven constructed in such a manner that the products of combustion will flow in opposite directions through said top, a smoke pipe that communicates with said flue space, a damper for closing said smoke pipe, discharge flues in the side walls and rear wall that communicate with the flue space in the top wall of the oven through which the products of combustion escape, inlet flues at the sides of the oven that communicate with the upper portion of the oven, and heat absorbing material arranged in proximity to said flues so as to absorb heat from the escaping products of combustion.

FRANKLIN P. McCARTY.

Copies of this patent may be obtained for five cents each, by addressing the "Commissioner of Patents, Washington, D. C."